Nov. 17, 1959  G. V. WOODLING  2,913,258
METHOD OF MAKING AN OFFSET CONNECTOR BODY
Filed Feb. 2, 1951
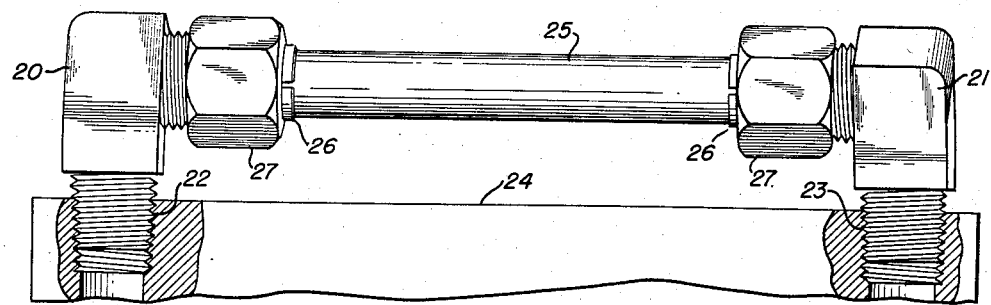
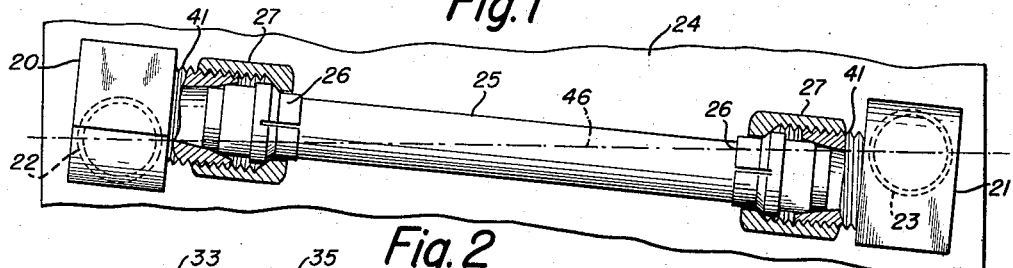
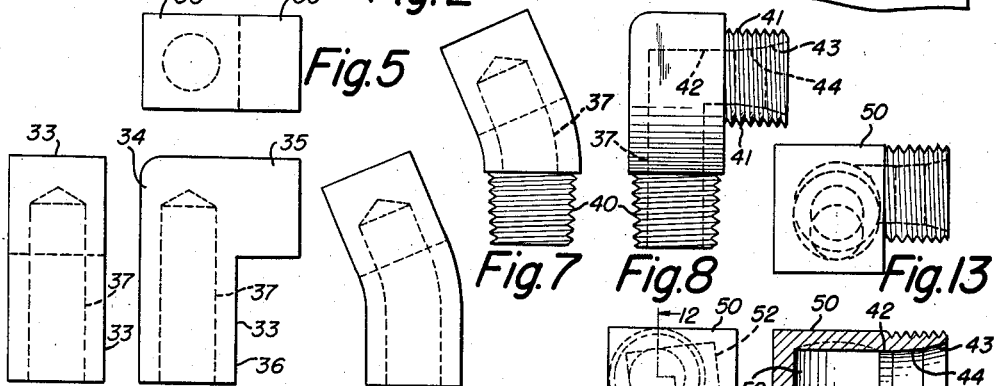
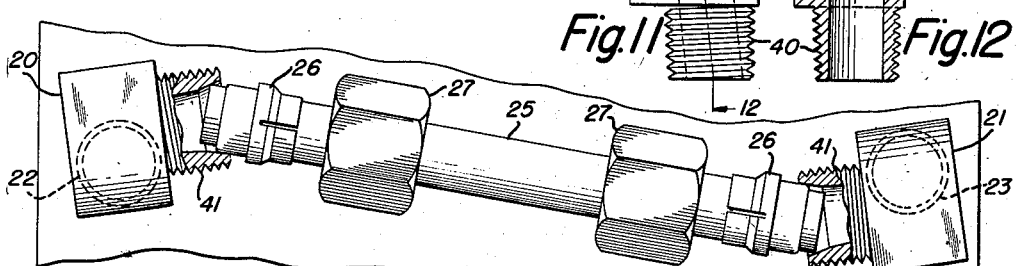
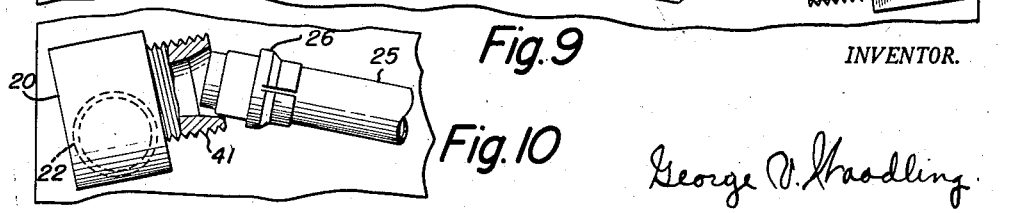
INVENTOR.
George V. Woodling.

United States Patent Office 2,913,258
Patented Nov. 17, 1959

2,913,258

METHOD OF MAKING AN OFFSET CONNECTOR BODY

George V. Woodling, Cleveland, Ohio

Application February 2, 1951, Serial No. 209,021

1 Claim. (Cl. 285—31)

This invention relates in general to tube couplings and more particularly to tube couplings having an offset connector body.

Commercial tube couplings are generally of two types: (1) the flare type and (2) the no-flare type. This invention is applicable to both types of fittings and particularly to the no-flare type.

The problem which the present invention solves is to enable a straight run tube to be mounted directly between two fixedly spaced hydraulic tube fittings having tube connection means facing each other, without dismantling the various parts of the fluid or hydraulic installation.

With T and elbow fittings of the flare type, it is possible to mount a straight run tube directly between the flared noses or facing end of the swinging arms of fittings without using the present invention, although the use of the present invention greatly faciltates such mounting. In mounting a straight run tube between the flared noses or facing ends of the swinging arms of two fixedly spaced T or elbow fittings of the flare type, the practice involves the steps of: First, substantially completely turning the threadable rotating arms of the tube fittings into their respective threaded ports, arresting rotation of the swing arms of the two fittings at an interim location substantially 30 to 45 degrees in advance of the final or completed stopping place where the two swinging arms are in straight alignment with each other. Secondly, flaring the two ends of the straight run tube and inserting these two flare ends of the tube upon the flared noses or facing ends of the swinging arms of the connector bodies. Thirdly, finishing the turning of the two fittings until the swinging arms thereof are in straight alignment with each other with the flared noses or facing ends fitting well into the flared ends of the tube.

After the third operation, the ends of the flared tube are sealingly anchored to the flared noses of the aligned swinging arms by means of a suitable anchoring nut or sleeve combination. In mounting a straight run tube between two fixedly spaced T and elbow fittings of the flare type, it is extremely essential that the tube be the exact length so as to enable the flared ends to be sealingly connected to the flared noses of the connector bodies.

With T and elbow fittings of the no-flare type, it is impossible to mount a straight run tube directly between the facing end of the swinging arms without using the present invention or an equivalent thereof. Thus, in the present application, my invention will be illustrated in connection with no-flare fittings, although it is to be understood that the present invention finds great utility with flare fittings. The reason that a straight run tube cannot be mounted directly between the facing ends of the swinging arms of two fixedly spaced no-flare fittings is that the ends of the tube must be inserted into the internal bores of the swinging arms of connector bodies for a short distance, usually in the neighborhood of from ⅜ of an inch to ½ inch or more. Thus, a situation is created where the straight run tube which is mounted between the facing ends of the swinging arms of two fixedly spaced no-flare fittings must be longer than the distance between the facing ends of the swinging arms of the connector bodies. The only way in which a tube may be mounted between the facing ends of the swinging arms of two fixedly spaced non-flare fittings in the absence of the present invention, is for the installation man to dismantle the various parts of the fluid or hydraulic system so that the straight run tube may be mounted between the dismantled parts after which the various parts are re-assembled. In the trade, no-flare fittings are being gradually accepted as a new trend and is rapidly relacing the flare type fittings. However, the ready acceptance of no-flare fittings have been held back by reason of the fact that a straight run tube cannot be directly mounted between the racing ends of the swinging arms of two fixedly spaced fittings unless the installation man dismantles various parts of the equipment in order to enable the tube to be inserted into the bores of the no-flare fittings.

Therefore, an object of the present invention is the provision of enabling the installation man to readily mount a straight run tube directly between the facing ends of the swinging arms of two fixedly spaced T or elbow fittings either of the flare or no-flare type, and particularly of the no-flare type.

Another object of the invention is the provision of an offset T or elbow fitting which enables the installation man to easily mount a straight run tube therebetween.

Another object of the present invention is the provision of a connector body coupling having an offset intermediate portion, so that the axis of the bore of the swinging arm of the fitting in which the tube is inserted is in a different plane from the axis of the bore of the threadable rotating arm of the fitting which threadably fits into a threaded port of the various parts of the hydraulic equipment.

Another object of the invention is the provision of a connector body coupling having an offset intermediate portion with a swinging arm and a rotating arm extending respectively from first and second sides of the intermediate portion and with the external surface of the swinging arm of the fitting generated about an axis lying in a plane different from the plane in which the axis about which the external surface of the rotating arm of the fitting is generated.

Another object of the invention is the provision of mounting a straight run tube directly between the facing ends of the swinging arms of two fixedly spaced fittings, whereby the tube itself is disposed at a diagonal angle with respect to a straight line passing directly between the axes of the threaded ports into which the threadable rotating arms of tube fittings are anchored.

Another object of the invention is the provision of providing a diagonally extending bore in one of the arms of a connector body coupling in order that the connector body coupling may be offset to enable a straight run tube to be directly connected between the facing ends of the swinging arms of two fixedly spaced fittings.

Another object of the invention is the provision of making an offset connector body couplings by first providing a bore in one of the arms of the coupling and then bending the bored arm in order to provide the offset relationship between the two arms of the fitting body.

Another object of the invention is the method of making an offset connector body coupling comprising the steps of providing communicating bores in the two arms of the couplings with one of said bores being diagonally disposed in order to accomplish the offset relationship and with one of said bores being recessed at the place where the two bores communicate with each other.

Other objects and a fuller understanding of the invention may be had by referring to the following description and claim, taken in conjunction with the accompanying drawing, in which:

Figure 1 is a side view of two fixedly spaced connector body couplings embodying the preferable features of my invention with a straight run tube mounted therebetween;

Figure 2 is a plan view of the fittings shown in Figure 1, with portions of the fittings shown in cross-section to illustrate the disposition of the connecting sleeve and nut which sealingly anchor the ends of the tubes to the inside of the swinging arms of the connector bodies;

Figure 3 is a side view of a blank connector body or block from which a T fitting is manufactured, showing the bore in the rotating arm of the fitting;

Figure 4 is a rear view of the blank connector body shown in Figure 3;

Figure 5 is a plan view of the blank connector body shown in Figure 3;

Figure 6 is a view similar to Figure 4, showing a rear view of the connector body after the rotating arm has been bent;

Figure 7 is a view similar to Figure 6, but showing the connector body after the pipe threads have been provided on the rotating arm thereof;

Figure 8 is a side view of the finished offset connector body with the swinging arm externally threaded and internally bored;

Figure 9 is a view showing the manner in which a straight run tube may be mounted or dismounted between the facing ends of the swinging arms of two fixedly spaced T fittings embodying the features of my invention;

Figure 10 is a view of the offset connector body shown at the left-hand end of the tube in Figure 9, but disposed at a slightly different rotating angle;

Figure 11 shows a side view of a modified form of an offset connector body coupling;

Figure 12 is a cross-sectional view of the modified offset connector body coupling shown in Figure 11, taken along the line 12—12 thereof; and Figure 13 is a top view of the modified offset connector body coupling shown in Figure 12.

With reference to the drawing, I illustrate two fixedly spaced offset connector body couplings 20 and 21 which are threadably connected respectively to two spaced threaded ports 22 and 23. The threaded ports 22 and 23 are illustrative and may be any two threadable spaced ports in a hydraulic unit such as a valve, cylinder or pump or any two threadable spaced ports in a hydraulic panel 24 upon which the hydraulic units are replaceably mounted. In any event, the spaced distance between the two threaded ports 22 and 23 are fixed. The two offset connector body couplings 21 and 22 are interconnected by a straight run tube 25 having its opposite ends respectively connected to the two offset connector body couplings 20 and 21 by means of a sleeve 26 and a nut 27.

The two offset connector body couplings 20 and 21 are identical and the manner in which they are manufactured is shown in Figures 3 to 8, inclusive. The Figures 3, 4, and 5 show respectively front, rear and top views of an L-shaped blank or block 33 from which the offset connector body coupling is made. As illustrated, the L-shaped blank or block comprises an intermediate portion 34, a swinging or first arm 35 and a rotating or second arm 36. The two arms 35 and 36 are indisposed substantially at right angles to each other making an elbow fitting. A longitudinal bore 37 is provided in the rotating arm 36. After the bore 37 is provided in the blank or block 33, the rotating arm 36 is bent as shown in Figure 6. After this operation, the bent L-shaped blank or block 33 is chucked in a turret lathe or other machine and the external surface of the lower end of the rotating arm 36 is first shaped round, after which pipe threads 40 are provided thereon such as shown in Figure 7. At the completion of the forming of the pipe threads, the L-shaped block is rechucked in the machine and the outer surface of the swinging arm 35 is shaped round after which machine threads 41 are provided thereon. Also while the L-shaped block remains chucked in the machine, the swinging arm 35 is provided with a bore 42 which communicates with the bore 37 in the rotating arm 36 to provide a passageway through the fitting. The bore 42 has an enlarged entrance camming surface 43 and a conical wedging surface 44. As shown in Figure 8, the machine threads 41 are generated about an axis extending laterally of or perpendicular to the right-hand side of the intermediate portion 34 of the coupling and the pipe threads 40 are generated about an axis extending vertically of or at a right angle to the axis of the machine threads. The two axes about which the machine threads 41 and the pipe threads are generated are disposed substantially at right angles to each other but each lie in a plane which is spaced from each other by an amount equal to the offset resulting from bending the rotating arm 36. The bore 42 including the entrance camming surface 43 and the conical wedging surface 44 have an axis substantially coinciding with the axis about which the machine threads 41 are generated. The lower portion of the bore 37 within the pipe threads 40 of the rotating arm 36 has an axis which coincides substantially with the axis upon which the pipe threads are generated. The entrance camming surface 43 makes an angle approximately 10 to 15 degrees with respect to the axis about which the machine threads 41 are generated and the conical wedging surface 44 makes an angle of approximately 3 to 6 degrees with respect to the axis about which the machine threads 41 are generated.

In mounting a straight run tube 25 between the facing ends of the swinging arms 35 of the two spaced offset connector body couplings 20 and 21, the following practice is recommended. First, the tube fittings are substantially turned tight, but not completely, into their respective threaded ports, leaving the rotation of the swinging arms 35 arrested at an interim location substantially from 13 to 15 degrees in advance of the final or completed stopping place where the two swinging arms 35 are in straight alignment with each other. Such an interim position is shown in Figure 10. Secondly, the two ends of the straight run tube are respectively inserted in the entrance camming surfaces 43, after which the coupling are slightly rotated to hold the two ends of the tube in place. This is the position shown in Figure 10. The two sleeves 26 and the two nuts 27 were previously inserted over the tube prior to the insertion of the ends of the tube into the entrance camming surfaces 43. In Figure 9, the external surface of the sleeves 26 substantially are in alignment with the side wall of the entrance camming surface 43. Thirdly, the two fittings are finally turned to their stopping place into the threaded ports, being the place where the swinging arms 35 are in substantially straight alignment with each other. In this position, the ends of the straight run tube project well into the conical wedging surfaces 44 of the swinging arms. After the third operation, the ends of the straight run tube 25 are sealingly anchored to the swinging arms 35 by means of the sleeves 26 and the nuts 27, see Figure 2. The construction of the sleeves 26 and the nuts 27 may be of any suitable design and preferably may be the same as shown in my pending application, Serial No. 131,587, filed December 7, 1949, for Contractible Sleeve for Tube Fitting.

The straight run tube 25 may be dismantled from the two offset connector body couplings in a reverse manner to that explained for the mounting of the tube between the fittings. The correct length of the tube is determined automatically, in that the tube is automatically of the right length to project well into the conical wedging surfaces 44, if the ends just clear the facing ends of the swinging arms as shown in Figure 10. Thus, when the swinging arms are swung around to their final stopping or assembled places, the ends of the tube wedgingly fit within the conical wedging surface 44 as shown in Figure 2. By reason of the offset construction, the swinging arms, as they are swung around toward their assembly position, describe a compound movement; in that one movement comprises the swinging arms longitudinally moving toward each other, and the other movement comprises the swinging arms moving in a circle. The same compound movement is effected upon disassembly, except that the swinging arms longitudinally move away from each other. The amount of the longitudinal movement depends upon the extent that the rotating arm 36 is bent. It is the movement effected by the offset that enables a straight run tube to be connected between the facing ends of the swinging arms of two fixedly spaced fittings, even though the tube is longer than the distance between the facing ends of the two spaced swinging arms in their assembled position. Therefore, with the present invention, it is possible to mount a straight run tube directly between two connector bodies which are fixedly spaced with respect to each other.

While the invention is illustrated as being applied to no-flare fittings, it is obvious that the same invention applies equally well to facilitate the mounting of a straight run tube having flared ends between two flare type fittings.

In the final assembly of the tube 25 as shown in Figure 2, the longitudinal axis of the tube 25 is disposed diagonally with respect to a straight line 46 passing directly between the axes of the threaded ports 22 and 23. In Figure 2, this angle is approximately 5 degrees, although it may vary depending upon the amount of the offset. One benefit arising from the fact that the tube 25 is diagonally disposed with respect to the straight line 46 is that the tube and the two offset couplings do not operate as a perpendicular column as viewed from the axes of the two thread ports 22 and 23. Mechanical strains which are imposed on the tube in the direction of the straight line 46 are allowed to be relieved by the tube slightly buckling, since the tube does not function as a perpendicular column.

In Figures 11, 12 and 13 I show a modified offset connector body coupling 50, in that the bore 51 in the rotating arm 36 is disposed at an angle to the axis upon which the pipe threads 40 are generated. In order that the diagonally disposed bore 51 may amply communicate with the bore 42 in the swinging arm, the upper inner end of the bore 51 is recessed at 52. This recess provides unrestricted communication between the two bores. Otherwise, the actoin of the modified fitting shown in Figures 11, 12 and 13 is the same as that described with reference to the preferred form of the fitting shown in Figure 8.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

The process of making an offset connector body coupling comprising the steps of providing a body having an intermediate portion with at least first and second end portions fixedly extending respectively from first and second sides of the intermediate portion, generating an external surface on said first end portion about an axis fixedly extending in the first direction from said first side of the intermediate portion of the body, generating an external surface on the second end portion about an axis fixedly extending in a second direction from said second side of the intermediate portion of the body with the generating axis of the second end portion lying in a plane fixedly different from the plane in which the generating axis of the first end portion lies, providing a bore including an internal camming surface in the first end portion having an axis substantially coinciding with the generating axis of the said first end portion, providing a bore in the second end portion having an axis substantially coinciding with the generating axis of the second end portion, bending said second end portion and thereby fixedly shifting the generating axis of the second bore from said first plane into a second plane spaced from said first plane.

References Cited in the file of this patent
UNITED STATES PATENTS

| | | |
|---|---|---|
| 691,246 | Cram | Jan. 14, 1902 |
| 871,347 | Klessig | Nov. 19, 1907 |
| 1,057,289 | Sieber | Mar. 25, 1913 |
| 1,370,074 | Vasselli | Mar. 1, 1921 |
| 1,615,204 | Huyette | Jan. 18, 1927 |
| 1,851,031 | Baldwin | Mar. 29, 1932 |
| 1,912,750 | Zerk | June 6, 1933 |
| 1,969,142 | McIntyre | Aug. 7, 1934 |
| 2,065,523 | Groeniger | Dec. 29, 1936 |
| 2,216,460 | Sisk | Oct. 1, 1940 |
| 2,251,716 | Parker | Aug. 5, 1941 |
| 2,292,328 | Sisk | Aug. 4, 1942 |
| 2,326,037 | Jung | Aug. 3, 1943 |
| 2,342,425 | Parker | Feb. 22, 1944 |
| 2,344,698 | Howe | Mar. 21, 1944 |
| 2,447,060 | Franck | Aug. 17, 1948 |
| 2,472,872 | Woodling | June 14, 1949 |
| 2,564,428 | Ford | Aug. 14, 1951 |

FOREIGN PATENTS

| | | |
|---|---|---|
| 524,136 | Great Britain | July 30, 1940 |